United States Patent [19]

Kataoka

[11] Patent Number: 5,477,100
[45] Date of Patent: Dec. 19, 1995

[54] VIBRATION TYPE MOTOR SYSTEM

[75] Inventor: Kenichi Kataoka, Yokohama, Japan

[73] Assignee: Canon Kabushiki Kaisha, Tokyo, Japan

[21] Appl. No.: 95,496

[22] Filed: Jul. 26, 1993

Related U.S. Application Data

[63] Continuation of Ser. No. 937,431, Aug. 31, 1992, abandoned, which is a continuation of Ser. No. 661,245, Feb. 27, 1991, abandoned.

[30] Foreign Application Priority Data

Mar. 1, 1990 [JP] Japan ................... 2-050204

[51] Int. Cl.$^6$ .................................. H02N 2/00
[52] U.S. Cl. ............................ 310/323; 310/316
[58] Field of Search ................... 310/316, 323, 310/328

[56] References Cited

U.S. PATENT DOCUMENTS

| | | | |
|---|---|---|---|
| 3,992,694 | 11/1976 | Ehrlich | 310/316 |
| 4,011,472 | 3/1977 | Feng | 310/328 |
| 4,062,227 | 12/1977 | Heyman | 73/630 |
| 4,181,864 | 1/1980 | Etzold | 310/316 |
| 4,191,193 | 3/1980 | Sea | 128/675 |
| 4,395,908 | 8/1983 | Shopland | 73/516 LM |
| 4,407,693 | 10/1983 | Paquin | 156/436 |
| 4,417,476 | 11/1983 | Knowlton | 73/660 |
| 4,488,873 | 12/1984 | Bloomfield et al. | 433/71 |
| 4,656,870 | 4/1987 | Ruthraf et al. | 73/629 |
| 4,662,212 | 5/1987 | Noguchi et al. | 73/24 |
| 4,705,980 | 11/1987 | Mishiro | 310/323 |
| 4,780,861 | 10/1988 | Stembridge et al. | 367/150 |
| 4,794,295 | 12/1988 | Penneck et al. | 310/330 |
| 4,798,990 | 1/1989 | Henoch | 310/323 |
| 4,857,793 | 8/1989 | Okuno | 310/328 |
| 4,914,337 | 4/1990 | Takagi | 310/316 |
| 4,924,715 | 5/1990 | Schaffer | 73/865.8 |
| 4,952,834 | 8/1990 | Okada | 310/316 |
| 4,965,481 | 10/1990 | Kashiyama | 310/316 |
| 4,965,482 | 10/1990 | Ohnishi et al. | 310/323 |
| 4,979,952 | 12/1990 | Kubota et al. | 310/316 |
| 4,990,815 | 2/1991 | Lindner et al. | 310/316 |
| 4,998,048 | 3/1991 | Furutsu | 310/316 |
| 5,001,382 | 3/1991 | Umeda et al. | 310/328 |
| 5,001,404 | 3/1991 | Kataoka | 310/316 |
| 5,021,700 | 6/1991 | Takahashi et al. | 310/316 |
| 5,023,526 | 6/1991 | Kuwabara et al. | 310/316 |
| 5,050,587 | 9/1991 | Sagara et al. | 310/323 |
| 5,061,882 | 10/1991 | Takagi | 310/316 |
| 5,062,622 | 11/1991 | Kataoka et al. | 310/323 |
| 5,093,606 | 3/1992 | Adachi et al. | 318/116 |
| 5,136,425 | 8/1992 | Fujie et al. | 310/323 |
| 5,140,231 | 8/1992 | Kashiyama | 310/316 |
| 5,149,080 | 9/1992 | Yamamoto | 310/323 |
| 5,155,408 | 10/1992 | Takeuchi | 310/328 |

FOREIGN PATENT DOCUMENTS

| | | | |
|---|---|---|---|
| 2245652 | 3/1974 | Germany | 310/316 |
| 1516950 | 10/1989 | U.S.S.R. | 310/316 |
| 1429856 | 3/1973 | United Kingdom | 310/316 |

OTHER PUBLICATIONS

"Linear and Interface Circuits Applications", 1985, vol. 2, pp. 9–2 to 9–4, Texas Instruments.

*Primary Examiner*—Thomas M. Dougherty
*Attorney, Agent, or Firm*—Fitzpatrick, Cella, Harper & Scinto

[57] ABSTRACT

A vibration type motor system obtains the drive force by supplying frequency signals to electro-mechanical energy conversion elements provided on a vibration member. The motor system adopts a specific configuration to include a pair of lines and others structured by twisting the connection lines for applying frequency signals from the drive circuit to the conversion elements.

7 Claims, 6 Drawing Sheets

VIBRATION TYPE MOTOR SYSTEM

This application is a continuation of application Ser. No. 07/937,431 filed Aug. 31, 1992, now abandoned which is a continuation of application Ser. No. 07/661,245 filed Feb. 27, 1991, now abandoned.

BACKGROUND OF THE INVENTION

1. Field of the Invention

This invention, related to the connection device of cables for connection between a vibration wave driven motor and its driving circuit, is used, for example, on the equipment which generates a lot of electro-magnetic noise such as robots etc. Also, the vibration wave driven motor is used on feeble signal detection equipment susceptible to the noise, in the vicinity of such equipment, or at locations away from driving circuits. This invention pertains to the cable connection device of the noise free vibration wave driven motor when used under such circumstances.

2. Related Background Art

On the vibration wave driven motor, a piezo-electric element functioning, as an electro-mechanical energy conversion element is bonded on one side of an elastic member. This piezo-electric element is further provided with plural divided driving phases (electrodes) possessing predetermined phases, driving sensor phases (electrodes) etc. for detecting the vibration state of the elastic member. The driving circuit is connected to each motor phase with a connecting cable and traveling waves are generated on the elastic member by applying AC voltage having a predetermined phase difference at the driving phases.

When a vibration wave driven motor has two driving phases, i.e. A phase and B phase, said connecting cables are provided in two pieces for driving, in one piece for grounding, and in the number of pieces equal to the number of driving detection sensors.

In other words, the grounding cable is used as a common electrode.

However, noise is liable to occur on the connecting cables used to connect the above-mentioned driving circuit to the vibration wave driven motor. As a result, electromagnetic noise or electrostatic noise is often created in the exterior or noise tends to be mixed with the vibration detection signals from the exterior. Further, when the connecting cables are lengthened, there is a possibility of leakage of the AC voltage used for driving, into the vibration detection signals, consequently leading to the following problems.

(1) When the motor is used near intense electro-magnetic noise generating sources such as robots, noise is overlapped on the vibration detection signals resulting in degrading the control performance (wow/flutter stop position accuracy).

(2) Since noise is generated to the exterior, external devices tend to malfunction.

(3) As a result of overlapping of AC voltage for driving onto the vibration detection signals, detection of actual vibration becomes impossible, vibration control performance is degraded, and wow/flutter stop position accuracy drops.

Further, because drive signals are overlapped on potential of the elastic member by current flow through grounding cables, drive signals leak into the devices connected to the vibration wave driven motor and malfunction occurs in external devices.

SUMMARY OF THE INVENTION

One aspect of the application is to provide a return wire for the current supplied from the driving circuit to the driving phase of the vibration wave driven motor. Also by providing a dedicated grounding wire for determining a potential of the elastic member of the motor, device or a motor system can be offered to the potential levels of the elastic member of the motor can be stabilized.

One aspect of the application is, under the above-mentioned aspect, to provide the connection device or the motor system designed to prevent noise occurrence by using the twisted lines for said return wire and-supply wire for sensing drive current from the driving circuit to the above-mentioned driving phases.

One aspect of the application is, when the phase detection signals indicating the operating state of the vibration wave driven motor are transmitted from the motor to the driving circuit by way of the detection wire, to covering the detection wire with a conductor to prevent noise effects.

Under one aspect of the application, traveling waves are formed on the elastic member by applying AC voltage respectively with predetermined phase difference. This AC voltage application is made to plural driving phases of said electro-mechanical energy conversion element of the vibration member. This elastic member, possessing electric conductivity, is bonded with the electro-mechanical energy conversion element by retaining the current flow status with the common electrode on the element's one-side surface. Also, available there are the vibration wave driven motor which performs relative movement of said elastic member and the member part in press contact with this elastic member as well as the cable connection device of vibration wave driven motor which connects the driving circuit of said vibration wave driven motor. Then, on these vibration wave driven motor and cable connection device, AC voltage supply cables are provided in the form of a pair at each driving phase of said electro-mechanical energy conversion element. At the same time, the twisted lines are used on these cables in a pair and by covering all these cables including such twisted lines with external conductors, electrostatic shielding is applied. Therefore, the one aspect of the application serves to provide the connection device or the motor system on which one-end power supply side of paired cable is connected to the elastic member and the grounding potential supply cable is also connected to this elastic member.

Other aspects of the subject invention will be further clarified by the embodiments which are subsequently explained with the aid of drawings.

DETAILED DESCRIPTION OF THE PREFERRED EMBODIMENTS

Figure 1:
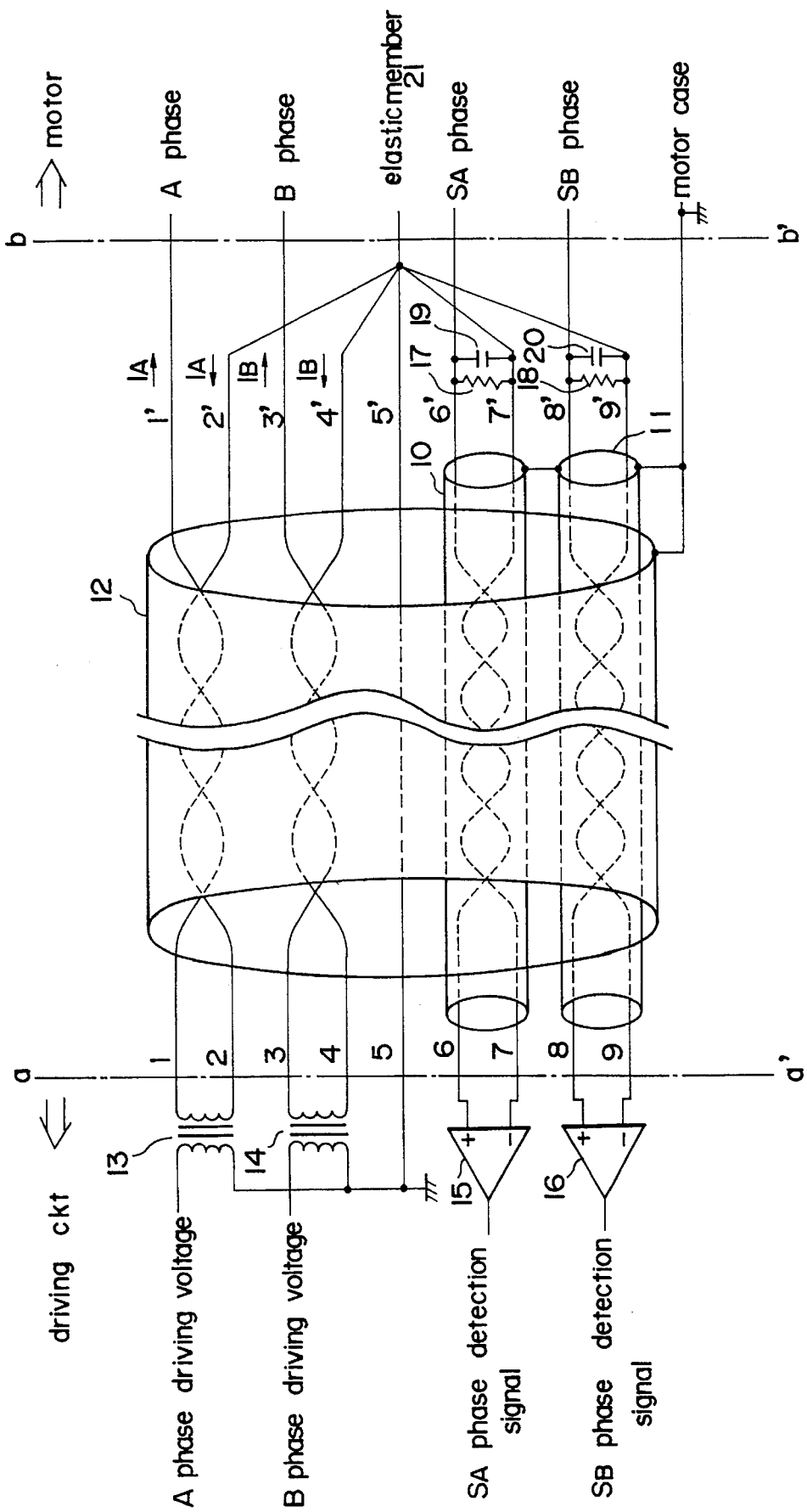
FIG. 1 shows an embodiment of the cable connection device of the vibration wave driven motor covered by the subject invention.
Figure 2A:
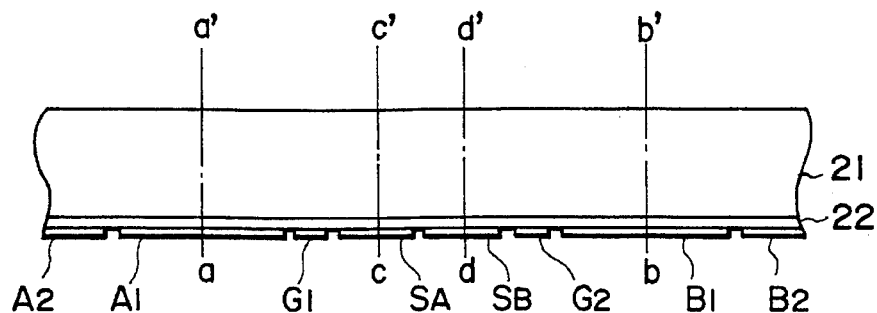
FIG. 2A is the side-view of the vibration wave driven motor.
Figure 2B:
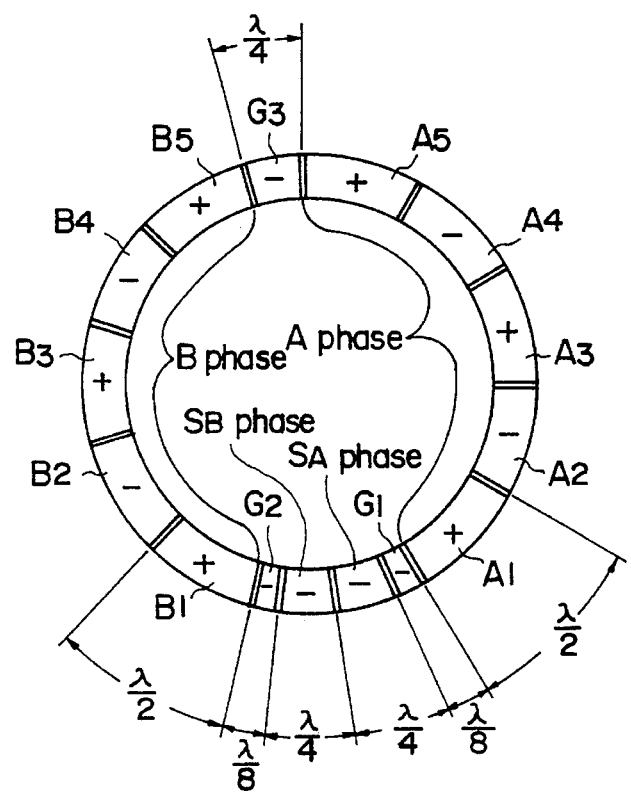
FIG. 2B is the drawing showing the electrode pattern of piezo-electric element.

FIG. 1 is the drawing which shows the embodiment of the cable connection device of vibration wave driven motor pertaining to the present invention. FIGS. 2A and 2B are the drawings showing the patterns of the piezo-electric element bonded to the elastic member.

With reference to FIGS. 2A and 2B, 21 is a metallic elastic member formed into the ring shape with a piezo-electric element 22 bonded to its one side with bonding agent. One side of this piezo-electric element 22 is electrically connected with the elastic member 21. Further, the piezo-electric element 22 is provided with the electrode groups arranged in the pattern shown in FIG. 2B. Of these electrode groups, the group A1 through A5 are the driving-use A phases possessing relative interval of λ/2 (λ is a wavelength) while being configured with the sections with different polarities. On the other hand, $B_1$ through $B_5$, are driving-use B phases structured similarly to A phase. These A phase and B phase are arranged at the positions relatively shifted by λ/4.

The driving-use A phase and B phase are supplied with AC voltages with 90° phase shifting in time from the driving circuit (not shown in the figure) by way of the connected cable. Then, traveling waves are formed on the elastic member 21 by means of composition of the standing waves respectively generated by driving of A phase and B phase.

$S_A$ and $S_B$ are the vibration detecting electrodes for detecting the standing waves generated by driving of A phase and B phase (hereinafter abbreviated as $S_A$ phase and $S_B$ phase). These electrodes are arranged in the positional phases as shown in FIG. 2B. As is evident from FIG. 2A, $S_A$ phase is provided in the area centered around from antinode position a-a' line of the standing waves to c-c' line position with λ/2 shifting. As for $S_B$ phase, it is provided in the area centered around from antinode position b-b' line of the standing waves generated by B phase driving to d-d' line position with λ/2 shifting. The signals detected by these $S_A$ phase and $S_B$ phase are output to the driving circuit by way of the connecting cable.

$G_1$, $G_2$, and $G_3$ are the electrodes to the ground and these electrodes are arranged by being provided with the positional phase shown in FIG. 2B. It should be noted that regarding the pattern shown in FIG. 2B, (+) and (−) codes show the polarity directions of piezo-electric element at respective positions.

Based on FIG. 1, explanations will hereinafter be made regarding the embodiment of the cable connection device which connects the vibration wave driven motor with the above-mentioned arrangement to its driving circuit.

Numerals 1-1' and 2-2' as well as 3-3' and 4-4' are pairs of twisted lines respectively. Cables 1 and 2 as well as 3 and 4 are respectively connected to the secondary sides of transformers 13 and 14 (to be explained later) on which A phase drive voltage and B phase drive voltage from the vibration wave driven motor are applied to the primary sides. Further, the cables 1' and 3' are connected to A phase and B phase of the vibration wave driven motor while the cables 2' and 4' are connected to the elastic member 21 of the vibration wave driven motor. 5-5' is the cable used to set elastic member potential of the vibration wave driven motor to ground potential of the vibration wave driven motor driving circuit.

Numerals 6-6' and 7-7' as well as 8-8' and 9-9' are pairs of twisted lines. The cables 6' and 8' are connected to $S_A$ phase and $S_B$ phase of the vibration wave driven motor while the cables 7' and 9' are connected to the elastic member 21 of the vibration wave driven motor. Between the pairs of 6'-7' and 8'-9', respectively connected are resistors 17 and 18 for high-pass filters and capacitors 19 and 20 for voltage dividing. The low frequency components of signals detected at $S_A$ phase and $S_B$ phase are cut-off, voltage dividing is effected by voltage-dividing capacitors 19 and 20 as well as by resistors 17 and 18, which act as high-pass filters. These signals are respectively input into differential amplifiers 15 and 16. Then, output is made of $S_A$ phase detection signals and $S_B$ phase detection signals to the vibration wave driven motor driving circuit. 10 and 11 represent small diameter external conductors formed into a cylindrical shape to allow electrostatic shielding of the cables 6-6', 7-7', 8-8', and 9-9', all these cables being connected to the vibration wave driven motor case. Connector 12 includes these small diameter external conductors 10 and 11 and functions as a large diameter external conductor to achieve connection shielding of all the cables used to connect the vibration wave driven motor driving circuit to the vibration wave driven motor. On the other hand, 13 and 14 are voltage boosting transformers for applying AC voltage to A phase and B phase of the vibration wave driven motor by boosting A phase drive voltage and B phase drive voltage from the vibration wave driven motor driving circuit.

Figure 3:
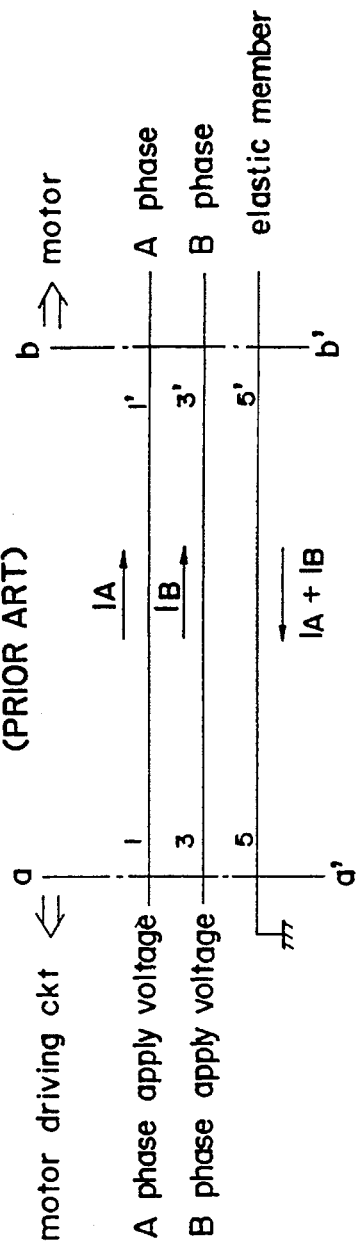
FIG. 3 explains the status of potential variations of the resilient member of a conventional cable connection device.

Explained hereinafter are the functions of the cable connection device with the above-mentioned structure. FIG. 3 is the approximate structure diagram showing the connection side of the vibration wave driven motor and the vibration wave driven motor driving circuit normally used until now. As shown in this FIG. 3, currents $I_A$ and $I_B$ supplied to A phase and B phase flow as current of "$I_A+I_B$" into the ground of the vibration wave driven motor driving circuit of the elastic member. Consequently, the potential of the elastic member is caused to vary in proportion to $I_A+I_B$ by electric resistance or inductance between cable 5-5', resulting in adverse effects on the external devices electrically connected to the elastic member.

Additionally, since single cable connection is employed, electro-magnetic noise is generated to the exterior. Therefore, in this embodiment, as shown in FIG. 1, the cables in the form of a pair are used to connect the driving circuit to the driving phase, $S_A$ phase, and $S_B$ phase of the vibration wave driven motor. As for connection between the elastic member 21 and the ground of vibration wave driven motor driving circuit, employed is a separate cable 5-5' through which driving current $I_A$ and $I_B$ do not flow. As a result, potential of the elastic member 21 can be maintained at the level of zero and generation of electro-magnetic noise can be prevented by twisting the pair of cables in which the same current flows in the opposite directions. At the same time, harmful influences on external devices can be avoided.

Next, explained hereinafter are affects of $S_A$ phase and $S_B$ phase connection method.

$S_A$ phase and $S_B$ phase of the piezo-electric element actually function as capacitors electrically. When $C_{SA}$ and $C_{SB}$ are assigned to the electrostatic capacitance of these capacitors, their output voltage can be expressed by $V_{SA}=$ $V_{SA} = Q_{SA}/C_{SA}$ and $V_{SB} = Q_{SB}/C_{SB}$ by assuming the charge amount generated by distortion as $Q_{SA}$ and $Q_{SB}$ and respective output voltage of $S_A$ phase and $S_B$ phase as $V_{SA}$ and $V_{SB}$.

FIG. 4 is the drawing for explaining the effects obtainable by shielding connecting cables 6-6' of $S_A$ phase.

Figure 4A:
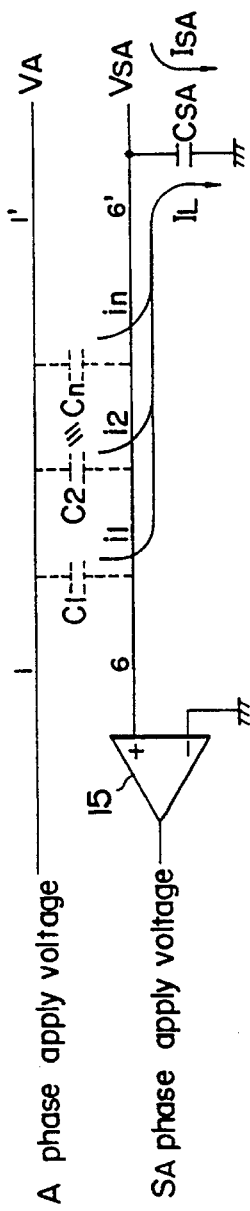
FIGS. 4A and 4B illustrate the influences caused by leakage current generated due to drive voltage.
Figure 4B:
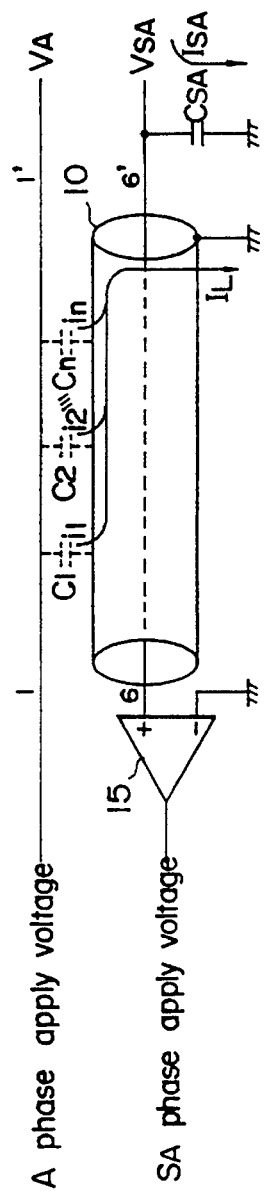

FIG. 4A is the drawing which shows the flow of electric charge when shielding is not made while FIG. 4B illustrates the electric charge flow when shielding is made.

Since A phase apply voltage $V_A$ is relatively intense in the form of high frequency signal, leakage current $I_L$ by way of stray capacitance $C_1, C_2, \ldots, C_n$ cannot be ignored. In other words, pertaining to FIG. 4A, by flow of leakage current $I_L$ into $S_A$ phase, voltage differing from actual vibration results can be generated. On the other hand, by shielding as per this embodiment shown in FIG. 4B, leakage current $I_L$ all flows into the ground by way of the shield. Therefore, what actually flows into $S_A$ phase is only the electric charge generated by vibration, thereby enabling accurate detection of vibration.

Also, as shown in FIG. 1, the cable 7-7' and 9-9' whose one ends are connected to the elastic member are twisted with the cables 6-6' and 8-8' whose one ends are connected to $S_A$ phase and $S_B$ phase. Further, the cables 6-6' and 7-7' as well as 8-8' and 9-9' can be relatively twisted by the twisting pitch different from that of the twisted lines of 1-1' and 2-2' as well as 3-3' and 4-4'. By adopting such twisting methods, more accurate vibration detection becomes possible without suffering from electromagnetic noise. This capability will eliminate the worst care of detection of reversal direction (from 90° to −90°) by malfunction of phase difference detection between $S_A$ phase and $S_B$ phase detection signals caused by impulse-type electromagnetic noise. In other words, serious malfunction of reversing of rotation direction of the vibration wave driven motor can be effectively prevented.

On the subject embodiment, the cables 6-6' and 7-7', small diameter conductor 10, cables 8-8' and 9-9', and small diameter conductor 11 are all collectively passed through the large diameter conductor 12. However, the small diameter conductors 10 and 11 may naturally be placed outside the large diameter conductor 12. Also, it is natural of course, to conduct cable connections in the numbers equal to the quantity of vibration detecting electrodes such as $S_A$ phase and $S_B$ phase and to the number of those A phase and B phase. Further, the use of fluoric resin of PTFE, PFA, FEP, ETPE, etc., with low dielectric rates as the material for insulation sheathing of cables will more reflectively reduce leakage current and give rise to very good characteristics.

Figure 8:
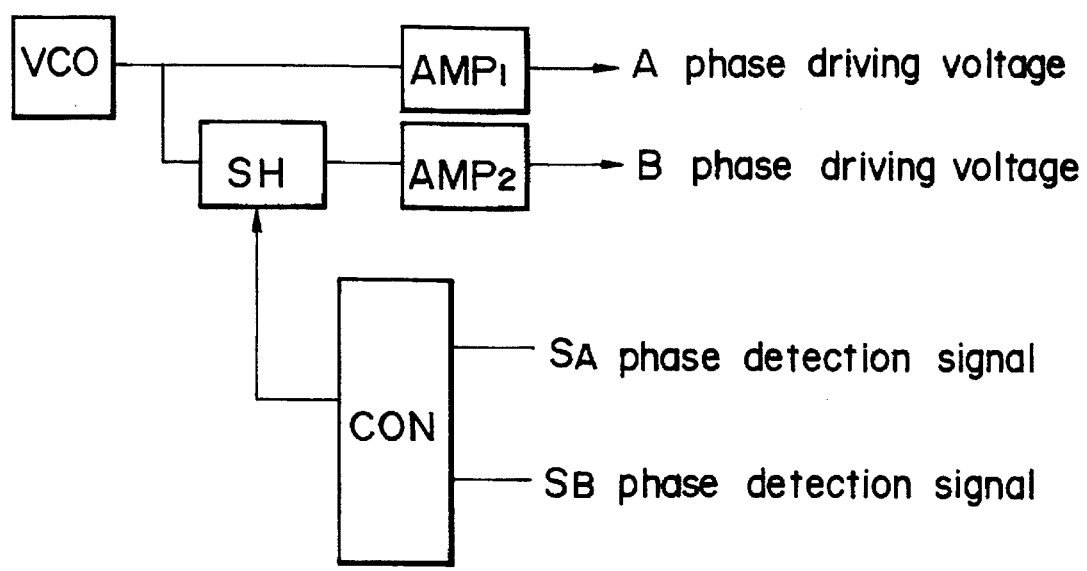
FIG. 8 is the block diagram showing an example of the drive circuit indicated in FIG. 1.

The driving circuit of the vibration wave driven motor shown in FIG. 1, may be structured as indicated in the block diagram of FIG. 8. Regarding this FIG. 8, VCO is an oscillation circuit, $AMP_1$ and $AMP_2$ are amplifiers, and SH is a phase shifter for shifting the phase of oscillation signals from the VCO. The signals from the VCO are output as A phase driving voltage to transformer 13 in FIG. 1 by way of $AMP_1$ while the signals shifted by the phase shifter SH are output as B phase driving voltage to the transformer 14 in FIG. 1 by way of the $AMP_2$. The CON is a control circuit which inputs $S_A$ phase and $S_B$ phase detection signals, detects phase difference between these two detection signals, and applies shift signals to the above-mentioned shifter SH. Based on the phase difference of $S_A$ and $S_B$ detection signals, this control circuit adjusts the phase shift amount at shifter SH. In this manner, used as an example of driving circuits adopted on the invention is the type which possesses the control function of driving voltage according to said detection signals.

Figure 5:
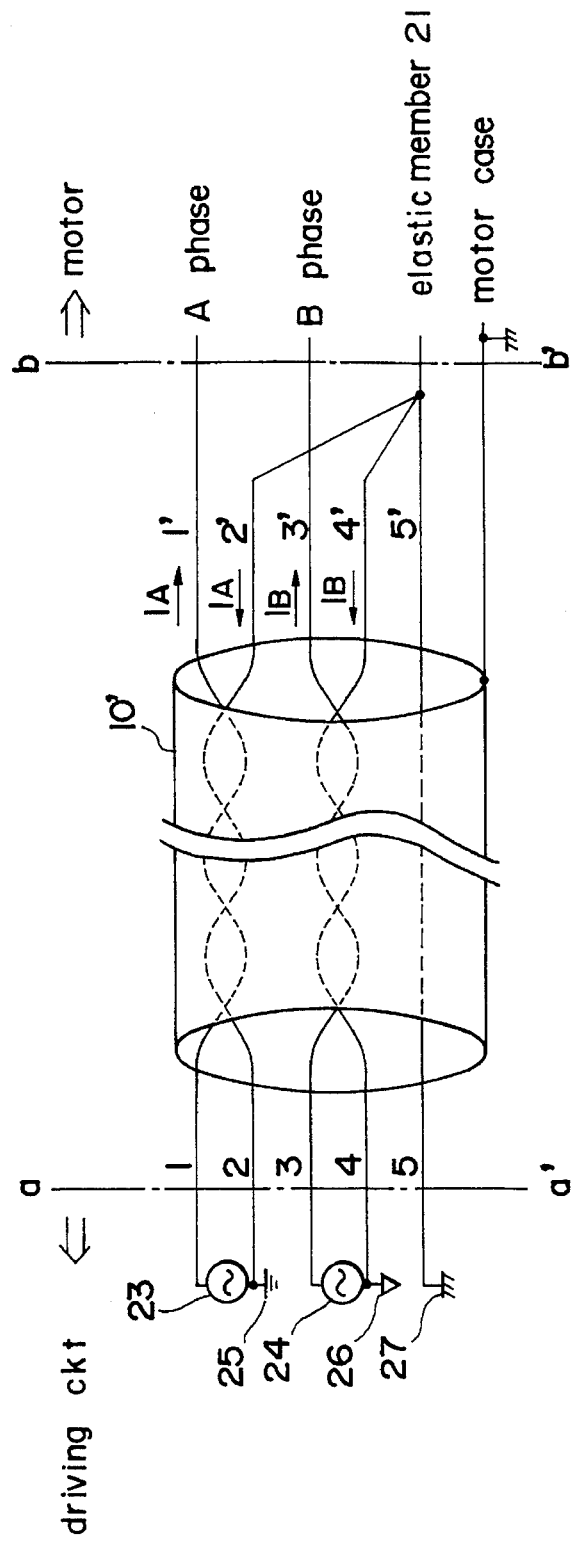
FIG. 5 shows another embodiment of the present invention.

FIG. 5 is the wire connection diagram that shows another embodiment of the present invention. Numerals 23 and 24 are signal generators which generate AC voltages with differing phases to be respectively applied to A phase and B phase. Numeral 27 represents a ground. Numeral 25 and 26 are grounds for the signal generators 23 and 24 and these grounds 25, 26, and 27 are not connected in common.

Cables 1-1', 2-2', 3-3', 4-4', and 5-5' are all covered with an external conductor 10' and the motor case and the external conductor 10' are electrically connected. Although not specifically depicted in the Figure, the ground 27 may be connected with the ground of the vibration detection circuit as shown in FIG. 1. The ground 27 also may be connected with, among the sensors of the encoder and the like attached to the vibration wave motor, the ground of power supply of the sensor, the case of which is electrically connected to the elastic member 21 and is sensitive to the noise. Consequently, potential of the elastic member 21 of the vibration-wave driven motor can be freed from influences of AC voltage applied to A phase and B phase. Additionally, because electrostatic or electro-magnetic noise is not generated in the exterior, stable controllability becomes obtainable.

Figure 6:
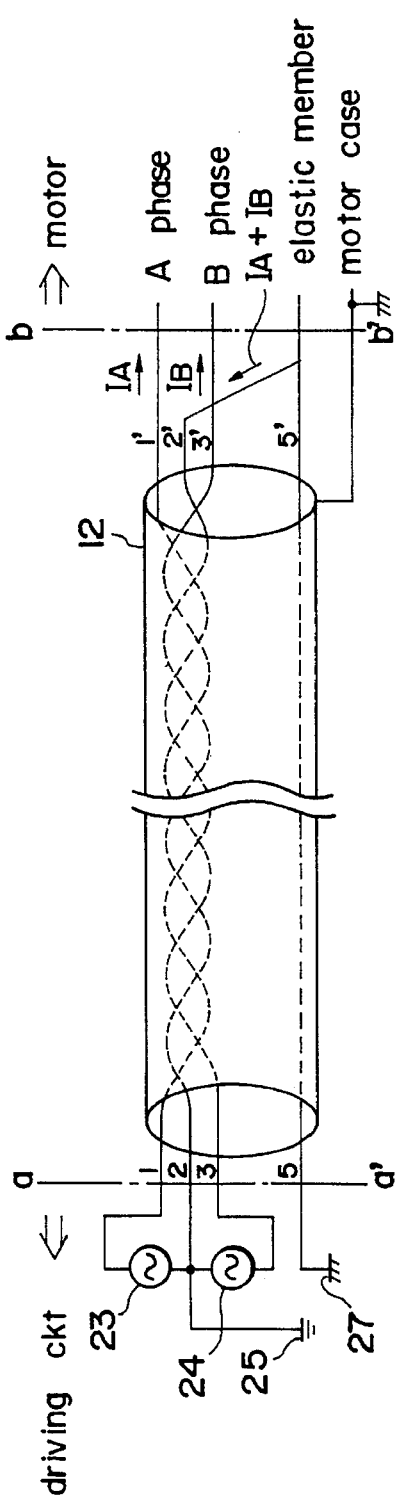
FIG. 6 is an altered example of the embodiment indicated in FIG. 5.

FIG. 6 shows the case of reduction of one piece of cable by adopting 3-cable twisting instead of 2-pair use of 2-cable twisted lines as shown in FIG. 5. Even in this alternative case, electro-magnetic noise generated by drive current $I_A$ and $I_B$ can be complemented by the fact that the cables 1-1', 2-2', and 3-3' are twisted.

Figure 7:
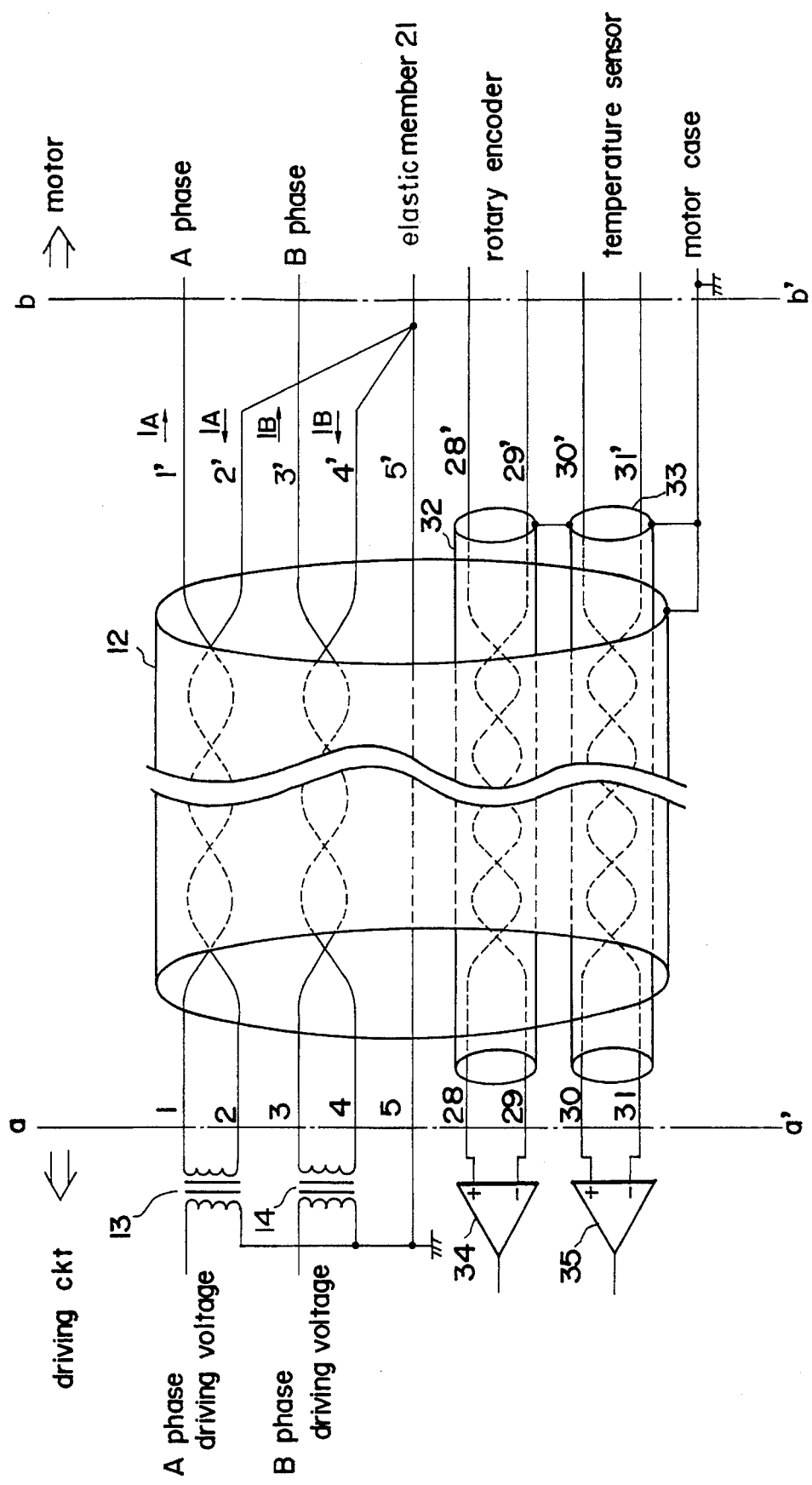
FIG. 7 shows another embodiment of this invention.

FIG. 7 is the wire connection diagram further showing another embodiment of the present invention. Cables 28-28' and 29-29', all being a twisted line, are connected to the output of a rotary encoder linked with the vibration wave driven motor not visible in FIG. 7. This output from the rotary encoder is in the form of balance output. Numerals 30-30' and 31-31' are also twisted lines and these cables are connected to a temperature sensor for detecting temperature levels of the elastic member of the vibration-wave driven motor. The cables 30-30' function to carry temperature signals and the cables 31-31' to indicate ground potential.

The cables 28-28' and 29-29' as well as the cables 30-30' and 31-31' are respectively covered with the small-diameter external conductors 32 and 33. Numerals 34 and 35 are differential amplifiers.

As explained above, when passing various sensor signals, such as those of rotary encoders, temperature sensors, etc., through the external conductor 12 of cables for driving the vibration wave driven motor, detection errors can be effectively eliminated by twisting the cables or covering them with external conductors.

Under the above-mentioned embodiment, a dedicated current return line is provided for each drive phase of the vibration wave driven motor. Further, employed is such an arrangement as to install a dedicated ground cable for determining potential of the elastic member. As a result, potential of the elastic member can be stabilized. Also, by shielding the twisted lines with external conductors, infiltrating noise can be blocked from external noise-generating sources. Such merits result in eliminating the need for installing noise filter circuits etc. on drive circuits and hence, in allowing fast-speed, high-accuracy controls.

Dedicated ground cables can also be provided for the cables for vibration detection phases. Then, by twisting these cables and applying electrostatic shielding with external conductors, the vibration detection signals can be successfully relieved from influences by external noise and other adverse factors.

Furthermore, said influences by drive signals to vibration detection signals can be further reduced by making the twisting pitch of AC voltage supply cables differ from the twisting pitch of vibration detection cables.

Since noise effects are not created even by extending lengths of connecting cables, minimum restriction occurs on installation sites of vibration wave driven motors concurrently permitting these motors to meet applications in wider varieties.

What is claimed is:

1. A vibration type motor system in which a vibration member is provided with a first electro-mechanical energy conversion element part and a second electro-mechanical energy conversion element part, and a driving force is obtained by respectively applying periodic signals having a phase difference therebetween to said first and second energy conversion element parts, said motor system comprising:
   (a) a motor driving control circuit having a first periodic signal forming circuit and a second periodic signal forming circuit, said first and second periodic signal forming circuits respectively producing first and second periodic signals having a phase difference therebetween, each periodic signal forming circuit having respective first and second terminals for generating one of the first and second periodic signals thereacross, each of said respective first and second terminals being isolated electrically from a power supply of said motor driving control circuit;
   (b) a first signal applying line portion including a first line for connecting a first terminal of said first periodic signal forming circuit with the first electro-mechanical energy conversion element part and a second line for connecting the second terminal of said first periodic signal forming circuit with said vibration member;
   (c) a second signal applying line portion including a third line for connecting the first terminal of said second periodic signal forming circuit with said second electro-mechanical energy conversion element part and a fourth line for connecting the second terminal of said second periodic signal forming circuit with said vibration member; and
   (d) a fifth line for connecting said vibration member with a ground potential portion of said power supply of said motor driving control circuit.

2. A vibration type motor system according to claim 1, further comprising a detection circuit for detecting a driving state of the motor, said motor driving control circuit part being provided with a driving state processing circuit which is connected with said detection circuit through a sixth line.

3. A vibration type motor system according to claim 1, wherein said vibration member is provided with an electro-mechanical energy conversion portion for detecting a vibration state of said vibration member, and said motor driving control circuit is provided with a vibration detection processing circuit, one input terminal of the vibration detection processing circuit being connected to said electro-mechanical energy conversion portion through a sixth line, and the other input terminal of the vibration detection processing circuit being connected to said vibration member through a seventh line.

4. A system according to claim 1, wherein said first periodic signal forming circuit includes a transformer wherein said first line is connected to one terminal of the secondary coil of said transformer and said second line is connected to the other terminal.

5. A system according to claim 1, wherein said first and second lines form a twisted pair and said third and fourth lines form a twisted pair.

6. A system according to claim 5, wherein a conductor is provided to cover said twisted pair lines.

7. A vibration type motor system in which a vibration member is provided with a first electro-mechanical energy conversation element part and a second electro-mechanical energy conversion element part, and a driving force is obtained by applying respective first and second periodic signals having a phase difference therebetween to said first and second energy conversion element parts, said motor system comprising:
   (a) a motor driving control circuit having a first transformer and a second transformer, first and second driving signals having a phase difference therebetween respectively being applied to a primary side of each of the first transformer and the second transformer, respective secondary sides of the first and second transformers each being isolated electrically from a power supply portion of the respective primary sides of said first and second transformers;
   (b) a first signal applying line portion including a first line for connecting one terminal of the secondary coil of the first transformer with the first electro-mechanical energy conversion element part and a second line for connecting the other terminal of the secondary coil of said first transformer with said vibration member, said first and second lines being isolated electrically from the primary side power supply portions of said first transformer;
   (c) a second signal applying line portion including a third line for connecting one terminal of the secondary coil of said second transformer with the second electro-mechanical energy conversion element part, and a fourth line for connecting the other terminal of the secondary coil of said second transformer with said vibration member, said third and fourth lines being isolated electrically from the primary side power supply of said second transformer; and
   (d) a fifth line for connecting a ground potential of the primary side of each of the first and second transformers of the motor driving control circuit with the vibration member.

* * * * *

UNITED STATES PATENT AND TRADEMARK OFFICE
CERTIFICATE OF CORRECTION

PATENT NO. : 5,477,100
DATED : December 19, 1995
INVENTOR(S) : KENICHI KATAOKA

It is certified that error appears in the above-indentified patent and that said Letters Patent is hereby corrected as shown below:

Column 2

Line 7, "device or a" should be deleted.
    Line 8, "motor system can be offered to" should be deleted.
    Line 13, "and-supply" should read --and supply--.
    Line 19, "covering" should read --cover--.

Column 5

Line 20, "cable" should read --cables--.

Column 6

Line 6, "Numeral 25" should read --Numerals 25--.

Signed and Sealed this

Seventh Day of May, 1996

Attest:

BRUCE LEHMAN

Attesting Officer

Commissioner of Patents and Trademarks